United States Patent
Park et al.

(10) Patent No.: US 10,623,806 B2
(45) Date of Patent: Apr. 14, 2020

(54) METHOD AND DEVICE FOR CHANGING ORIENTATION OF IMAGE BY WFD SINK

(71) Applicant: LG ELECTRONICS INC., Seoul (KR)

(72) Inventors: Giwon Park, Seoul (KR); Dongcheol Kim, Seoul (KR); Byungjoo Lee, Seoul (KR); Youngjun Jo, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,708

(22) PCT Filed: Mar. 11, 2016

(86) PCT No.: PCT/KR2016/002458
§ 371 (c)(1),
(2) Date: Mar. 8, 2018

(87) PCT Pub. No.: WO2017/043718
PCT Pub. Date: Mar. 16, 2017

(65) Prior Publication Data
US 2018/0262801 A1   Sep. 13, 2018

Related U.S. Application Data

(60) Provisional application No. 62/215,751, filed on Sep. 9, 2015.

(51) Int. Cl.
*H04N 21/4402* (2011.01)
*H04N 21/6587* (2011.01)
(Continued)

(52) U.S. Cl.
CPC ... *H04N 21/43637* (2013.01); *H04L 65/4069* (2013.01); *H04L 65/602* (2013.01);
(Continued)

(58) Field of Classification Search
CPC ........... H04N 21/43637; H04N 21/436; H04N 21/4363; H04N 21/4402; H04W 76/14;
(Continued)

(56) References Cited

U.S. PATENT DOCUMENTS

2013/0238702 A1* 9/2013 Sheth ...................... H04L 67/38
709/204
2014/0040959 A1* 2/2014 Oyman .............. H04N 21/6131
725/62
(Continued)

FOREIGN PATENT DOCUMENTS

JP    2015082026    4/2015
KR    1020140053934    5/2014
(Continued)

OTHER PUBLICATIONS

PCT International Application No. PCT/KR2016/002458, International Search Report dated Jun. 17, 2016, 2 pages.

*Primary Examiner* — Nathan J Flynn
*Assistant Examiner* — Caroline Somera
(74) *Attorney, Agent, or Firm* — Lee Hong Degerman Kang & Waimey

(57) ABSTRACT

A method for changing an orientation of an image by a WFD sink may comprise the steps of: transmitting, to a second WFD device, an RTSP M3 request message for requesting information on a video stream control RTSP parameter of the second WFD device by a first WFD device; receiving an RTSP M3 response message in response to the RTSP M3 request message from the second WFD device by the first WFD device, wherein the RTSP M3 response message includes a video stream control RTSP parameter for a video stream control capability of the second WFD device, transmitting a first video stream displayed in a first orientation on the second WFD device to the second WFD device by the first WFD device; receiving an RTSP M21 request message
(Continued)

from the second WFD device by the first WFD device, wherein the RTSP M21 request message requests a change into a second video stream displayed in a second orientation on the second WFD device of the first video stream; and transmitting an RTSP M21 response message to the second WFD device by the first WFD device, wherein the RTSP M21 response message indicates the acceptance of the change.

6 Claims, 10 Drawing Sheets

(51) Int. Cl.
| | | |
|---|---|---|
| *H04W 76/14* | (2018.01) | |
| *H04W 8/22* | (2009.01) | |
| *H04W 84/12* | (2009.01) | |
| *H04N 21/4363* | (2011.01) | |
| *H04L 29/06* | (2006.01) | |
| *H04L 29/08* | (2006.01) | |
| *H04N 21/41* | (2011.01) | |
| *H04W 8/00* | (2009.01) | |

(52) U.S. Cl.
CPC .......... *H04L 65/608* (2013.01); *H04L 67/148* (2013.01); *H04N 21/4122* (2013.01); *H04N 21/4402* (2013.01); *H04N 21/44029* (2013.01); *H04N 21/6587* (2013.01); *H04W 8/005* (2013.01); *H04W 76/14* (2018.02); *H04W 8/22* (2013.01); *H04W 84/12* (2013.01)

(58) Field of Classification Search
CPC .. H04W 8/005; H04W 84/12; H04L 65/4069; H04L 65/602; H04L 65/608; H04L 67/148
USPC .......................................................... 725/81
See application file for complete search history.

(56) References Cited

U.S. PATENT DOCUMENTS

| | | | |
|---|---|---|---|
| 2014/0096165 A1* | 4/2014 | Bei ........................ | H04N 19/46 725/81 |
| 2014/0210693 A1* | 7/2014 | Bhamidipati ....... | H04L 65/4092 345/2.3 |
| 2014/0247197 A1* | 9/2014 | Margulis ................ | G06F 1/266 345/2.3 |
| 2014/0358981 A1* | 12/2014 | Miyake ............... | H04L 67/1095 709/201 |
| 2016/0027399 A1* | 1/2016 | Wilde ................... | G06F 13/382 345/520 |
| 2016/0188279 A1* | 6/2016 | Rajamani .............. | G06F 3/1454 345/2.3 |
| 2016/0353425 A1* | 12/2016 | Iwami .................. | H04N 21/436 |
| 2017/0374412 A1* | 12/2017 | Park ........................ | H04L 29/08 |
| 2018/0295414 A1* | 10/2018 | Park ................... | H04N 21/4415 |

FOREIGN PATENT DOCUMENTS

| | | |
|---|---|---|
| KR | 1020140110047 | 9/2014 |
| KR | 1020150067240 | 6/2015 |
| WO | 2015115715 | 8/2015 |

\* cited by examiner

METHOD AND DEVICE FOR CHANGING ORIENTATION OF IMAGE BY WFD SINK

CROSS-REFERENCE TO RELATED APPLICATIONS

This application is the National Stage filing under 35 U.S.C. 371 of International Application No. PCT/KR2016/002458, filed on Mar. 11, 2016, which claims the benefit of U.S. Provisional Application No. 62/215,751 filed on Sep. 9, 2015, the contents of which are all hereby incorporated by reference herein in their entirety.

BACKGROUND OF THE INVENTION

Field of the Invention

The present disclosure relates to a wireless fidelity (WFD) display, and more particularly to a method and device for changing the orientation of an image by means of a WFD sink.

Related Art

The performance of mobile devices is greatly improved up to a degree comparable to that of personal computers (PCs), but there is still a limitation in the screen size. Particularly, as the portability of smartphones is important, the screen size of 6 inches is considered as the Maginot line, and a display of 6 inches may still be a small screen for a user who enjoys multimedia contents.

Accordingly, a technology for enabling a video viewed on a mobile device to be viewed on a large-screen TV (television) or a monitor is being studied. This technology may be represented by a term called wireless display transmission technology. The wireless display transmission technology may be roughly divided into content transmission and mirroring (screen casting). Content transmission needs to be linked with Video on Demand (VOD) service, not transmitting a mobile device screen as it is. The content transmission is a method of transmitting video signals, and the mirroring is a method of transmitting content files to a remote device by streaming and again displaying the content files on a large screen such as a TV.

The mirroring (screen casting), as the name implies, is a method of displaying the images outputted to a mobile device at the same time as if the images were mirrored. The mirroring (screen casting) is similar to a method of projecting a computer screen on a projector by connecting by wired methods such as D-Subminiature, RGB (D-sub), Digital Visual Interface (DVI) and High-Definition Multimedia Interface (HDMI) upon presentation. The mirroring method is advantageous in that pixel information of the original screen can be wirelessly transmitted without being dependent on a specific service in real-time.

WiFi Miracast is being studied as a wireless display transmission technology using WiFi. Miracast is a wireless video transmission standard and a wireless display transmission technology created by the WiFi Alliance. Miracast is a type of mirroring (screen casting) technology that compresses images and sounds to send the compressed images and sounds to a wireless LAN, and then decompresses the images and sounds in a dongle or an integral type of receiver to display the images and sounds on the screen.

SUMMARY OF THE INVENTION

The purpose of the present disclosure is to provide a method for changing the orientation of an image by a WFD sink.

Another purpose of the present disclosure is to provide a WFD sink to change the orientation of the image.

In one aspect, there is provided a method for changing an orientation of an image by a WiFi display (WFD) sink, the method comprising: transmitting, by a first WFD device, a real time streaming protocol message 3 (RTSP M3) request message to a second WFD device, wherein the RTSP M3 request message requests information on a video stream control RTSP parameter of the second WFD device; receiving an RTSP M3 response message from the second WFD device in response to reception of the RTSP M3 request message by the second WFD device, wherein the RTSP M3 response message includes a video stream control RTSP parameter about a video stream control capability of the second WFD device; transmitting a first video stream to the second WFD device, wherein the first video stream is to be displayed in a first orientation on the second WFD device; receiving an RTSP M21 request message from the second WFD device, wherein the RTSP M21 request message requests that the first video stream is changed to a second video stream, such that the second video stream is to be displayed in a second orientation on the second WFD device; and the first WFD device transmitting an RTSP M21 response message to the second WFD device, wherein the RTSP M21 response message indicates acceptance of the change, wherein the second WFD device is configured to receive the first video stream and the second video stream from the first WFD device over a peer-to-peer link with the first WFD device and to render the first video stream and the second video stream.

In another aspect, there is provided a first WiFi display (WFD) device configured for changing an orientation of an image, wherein the first WFD device includes: a communication unit configured for communicating with a second WFD device; and a processor operatively coupled to the communication unit, wherein the processor is configured for: transmitting a RTSP M3 request message to the second WFD device, wherein the RTSP M3 request message requests information on a video stream control RTSP parameter of the second WFD device; receiving an RTSP M3 response message from the second WFD device in response to reception of the RTSP M3 request message by the second WFD device, wherein the RTSP M3 response message includes a video stream control RTSP parameter about a video stream control capability of the second WFD device; transmitting a first video stream to the second WFD device, wherein the first video stream is to be displayed in a first orientation on the second WFD device; receiving an RTSP M21 request message from the second WFD device, wherein the RTSP M21 request message requests that the first video stream is changed to a second video stream, such that the second video stream is to be displayed in a second orientation on the second WFD device; and transmitting an RTSP M21 response message to the second WFD device, wherein the RTSP M21 response message indicates acceptance of the change, wherein the second WFD device is configured to receive the first video stream and the second video stream from the first WFD device over a peer-to-peer link with the first WFD device and to render the first video stream and the second video stream.

The instructions to control the resolution and refresh rate of the multimedia content for a user may be sent from the WFD sink to the WFD source. Thus, it may allow control of the resolution, and refresh rate, of the multimedia content played on the WFD source/WFD sink.

DESCRIPTION OF EXEMPLARY
EMBODIMENTS

In an existing wireless LAN system, an operation between apparatuses (AP and STA (station)) in an infrastructure basic service set (BSS) in which an access point (AP) functions as a hub is mainly defined. The AP may be responsible for a physical layer support function for wireless/wired connections, a routing function for devices on the network, a function of adding/removing devices to/from the network, and a service provisioning function. That is, in the existing wireless LAN system, the devices in the network are connected through the AP, and are not directly connected to each other.

A Wi-Fi Direct standard is defined as a technique for supporting direct connection between devices. The Wi-Fi Direct is a direct communication technology that enables easy connection between devices (or stations (STAs)) without an access point that is basically required in an existing WLAN system. When the WiFi Direct is used, a connection between devices may be established without complicated setup processes, and various services may be provided to a user.

In Wi-Fi Alliance (WFA), a Wi-Fi Direct Service (WFDS) that supports various services (e.g., Send, Play, Display, and Print) using Wi-Fi Direct links is being studied. According to WFDS, an application may be controlled or managed by a service platform called an Application Service Platform (ASP).

WFDS devices by supported WFDS include devices that support wireless LAN systems such as display devices, printers, digital cameras, projectors, and smart phones. Also, the WFDS device may include an STA and an AP. WFDS devices within a WFDS network may be directly connected to each other.

Figure 1:
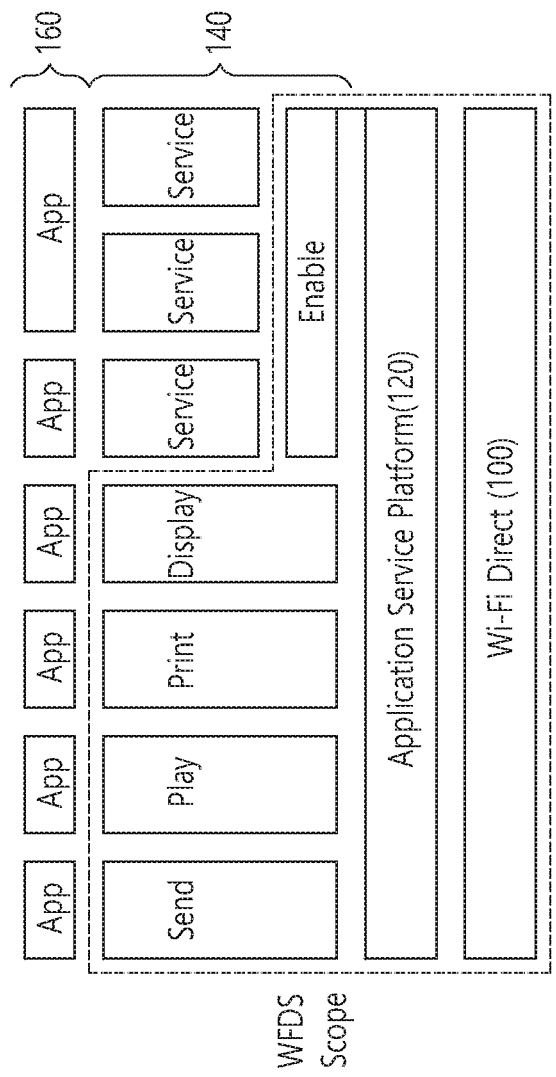
FIG. 1 is a conceptual diagram showing WiFi Direct Service (WFDS) framework components.

FIG. 1 is a conceptual view illustrating a WiFi Direct Service (WFDS) framework component.

Referring to FIG. 1, a WFDS framework may include a Wi-Fi Direct layer 100, an ASP 120, a service layer 140, and an application layer 160.

The Wi-Fi Direct layer 100 is a medium access control (MAC) layer defined in the Wi-Fi Direct standard. Under the Wi-Fi Direct layer 100, a wireless connection may be configured by a physical layer (not shown) compatible with the Wi-Fi PHY. Over the Wi-Fi Direct layer 100, an Application Service Platform (ASP) 120 is defined.

The ASP 120 is a common shared platform, and performs session management, service command processing, and inter-ASP control and security functions between the application layer 160 thereover and the Wi-Fi Direct layer 100 thereunder.

The service layer 140 is defined over the ASP 120. For example, in the service layer 140, four basic services such as Send, Play, Display, and Print services and services defined in a third party application may be supported. Also, the service layer 140 may support a Wi-Fi Serial Bus (WSB), a Wi-Fi Docking, or a Neighbor Awareness Network (NAN).

The application layer 160 may provide a User Interface (UI), may represent information in a human-recognizable form and deliver a user input to a lower layer.

Hereinafter, a Wireless Fidelity (WiFi) Display (WFD) among WFDS is more specifically disclosed in the embodiment of the present invention.

The WFD standard is defined to transmit audio/video (AV) data between devices while satisfying high quality and low latency. Through a WFD network (WFD session) to which the WFD standard is applied, Wi-Fi devices may be connected to each other in a peer-to-peer manner without going through a home network, an office network, or a hot-spot network. Hereinafter, a device for transmitting and receiving data according to the WFD standard may be expressed by a term called a WFD device. WFD devices in a WFD network may search for information (e.g., capability information) about the WFD device, and establish a WFD session, and then render the contents through the WFD session.

The WFD session may be a network between a source device providing contents and a sink device receiving and rendering contents. The source device may also be referred to as a term, the WFD source, and the sink device may also be referred to as a term, the WFD sink. The WFD source may mirror the data existing on the display (or screen) of the WFD source to the display of the WFD sink.

The WFD source and the WFD sink may exchange a first sequence message with each other to perform device search and service search procedures. After the device search and service search procedures between the WFD source and the WFD sink are completed, Internet Protocol (IP) addresses may be assigned to each of the WFD source and the WFD sink. A Transmission Control Protocol (TCP) connection is established between the WFD source and the WFD sink, and thereafter Real-Time Streaming Protocol (RTSP) and Real-Time Protocol (RTP) stacks for the WFD source and the WFD sink may be activated.

The capability negotiation procedure between the WFD source and the WFD sink is performed through the RTSP, and while the capability negotiation procedure is being performed, the WFD source and the WFD sink may exchange RTSP-based messages (M (message) 1 to M4). Thereafter, the WFD source and the WFD sink may exchange WFD session control messages. A data session through the RTP may also be established between the WFD source and the WFD sink. In the WFD network, a User Datagram Protocol (UDP) may be used for data transport.

Figure 2:
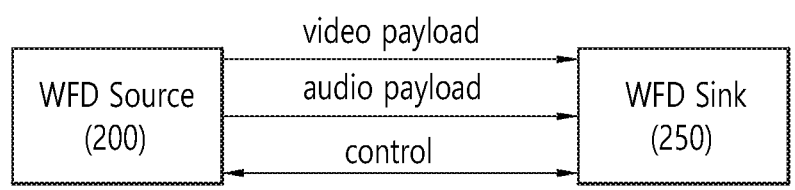
FIG. 2 is a conceptual diagram showing the WFD network.

FIG. 2 is a conceptual view illustrating a WFD network.

Referring to FIG. 2, a WFD source 200 and a WFD sink 250 as WFD devices may be connected based on WiFi-P2P.

Here, the WFD source 200 may be a device for supporting the streaming of multimedia contents through a WiFi Peer-to-Peer (P2P) link, and the WFD sink 250 may be a device that receives multimedia contents from the WFD source 200 through the P2P link and performs a procedure of generating images and/or sounds. The procedure of generating images and/or sounds may be expressed as a term called rendering The WFD sink 250 may be divided into a primary sink and a secondary sink. In particular, the secondary sink may render only an audio payload when connected independently of the WFD source 200.

Figure 3:
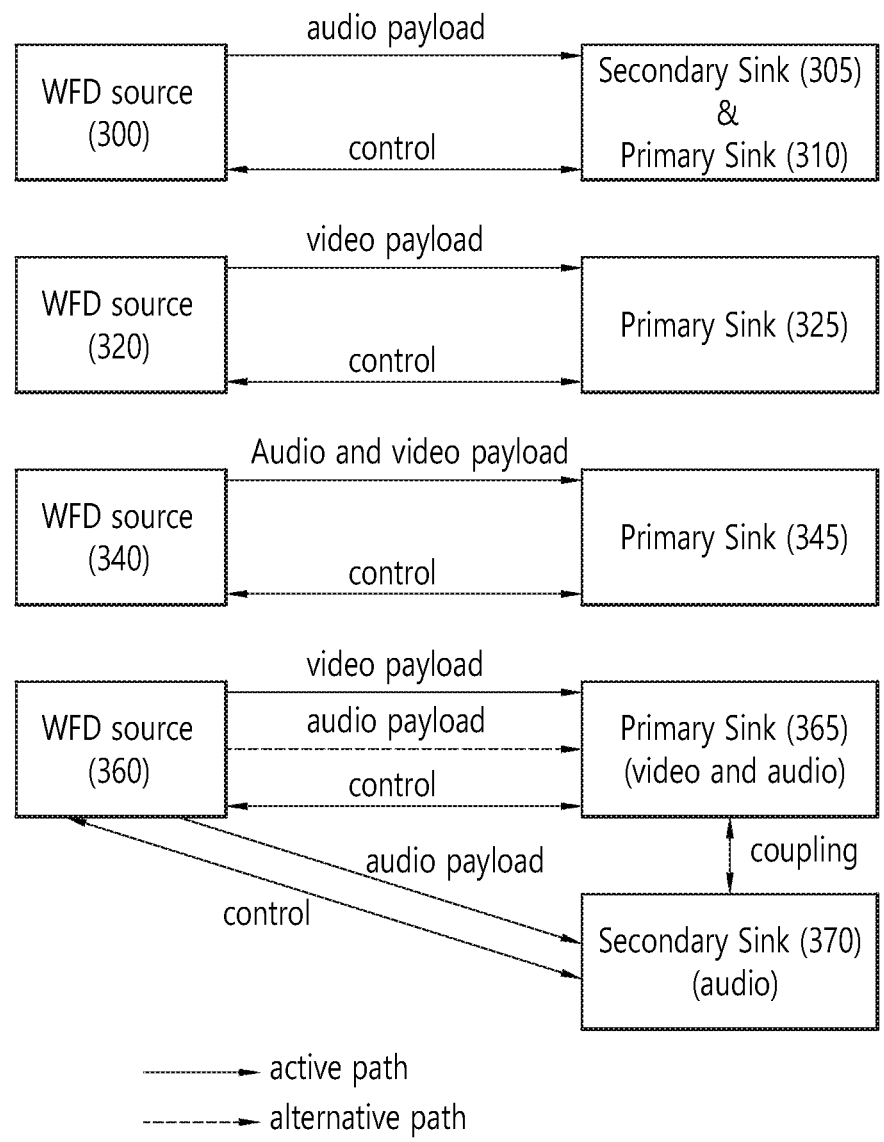
FIG. 3 is a conceptual diagram showing the WFD session.

FIG. 3 is a conceptual view illustrating a WFD session.

The first top of FIG. 3 is an audio-only session. A WFD source 300 may be connected to either a primary sink 305 or a secondary sink 310 through the audio-only session.

The second top of FIG. 3 is a video-only session. A WFD source 320 may be connected to a primary sink 325.

The third top of FIG. 3 is an audio and video session, and similarly to the video-only session, a WFD source 340 may be connected to a primary sink 345.

The fourth top of FIG. 3 discloses a session connection in a coupled WFD sink operation. In the coupled WFD sink operation, a primary sink 365 may render a video, and a secondary sink 370 may render an audio, respectively. Alternatively, the primary sink 365 may render both video and audio.

Figure 4:
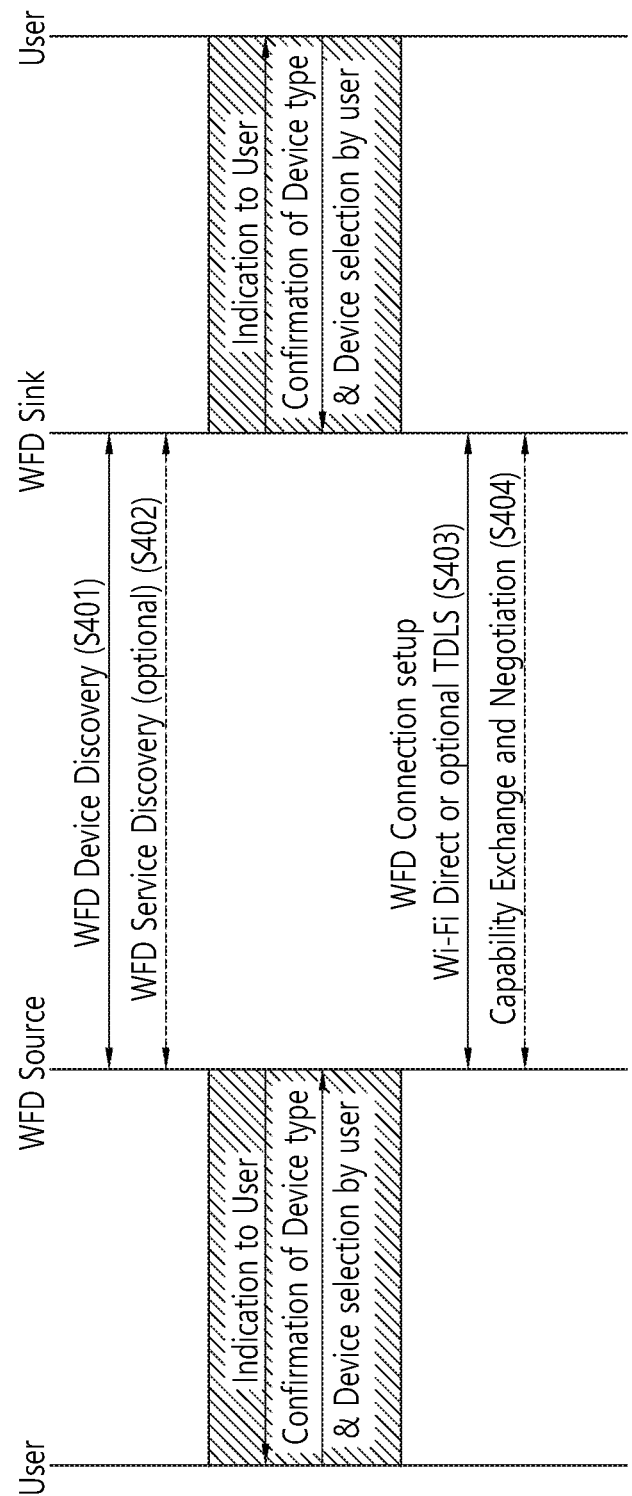
FIG. 4 is a conceptual diagram showing the WFD session configuration method.

Such a WFD session may be established after performing a procedure as shown in FIG. 4 below.

FIG. 4 is a conceptual view illustrating a WFD session configuration method.

Referring to FIG. 4, after a WFD device discovery (S401), a WFD service discovery (S402), a WFD connection setup (S403), and a capability exchange and negotiation (S404) are performed, a WFD session may be set.

Specifically, in the WFD device discovery procedure (S401), the WFD source may find a peer device for WFD, i.e., a WFD sink, through the WFD device discovery procedure.

A beacon frame, a probe request frame, and a probe response frame, etc. transmitted for WFD device discovery by the WFD source and the WFD sink may include a WFD Information Element (IE). Here, the WFD IE may be an information element including information related to WFD such as device type and device status.

The WFD source may send a probe request frame including the WFD IE to the WFD sink, and the WFD sink may transmit a probe response frame including the WFD IE in response to the probe request frame. If the WFD device is associated with an infrastructure AP and operates as a Wi-Fi P2P device, the probe request frame may include a WFD IE and a P2P information element. The probe response frame, which is a response to the probe request frame, may be transmitted through the channel through which the probe request frame is received, and may include both the P2P IE and the WFD IE.

Unmentioned contents related to the WFD device discovery may comply with the 'Wi-Fi Display Technical Specification' and/or the 'Wi-Fi Peer-to-Peer (P2P) Technical Specification Wi-Fi Direct Service Addendum' documents, which may be applied to the following descriptions.

In the WFD service discovery procedure (S402), a discovery for the service capability may be performed between the WFD source and the WFD sink performing the WFD device discovery. For example, when the WFD source transmits a service discovery request frame including information about the WFD capability, the WFD sink may send a service discovery response frame including information about the WFD capability in response to the service discovery request frame. The WFD service discovery procedure may be an optional procedure.

The probe request frame and the probe response frame used in the WFD device discovery procedure for performing the WFD service discovery procedure may include information indicating whether the WFD device has the capability to support the service discovery procedure.

In the WFD connection setup procedure (S403), the WFD device performing the WFD device discovery procedure and optionally the WFD service discovery procedure may select a WFD device for the WFD connection setup. After the WFD device for WFD connection setup is selected according to policy or user input, any one connectivity scheme of Wi-Fi P2P and tunneled direct link service (TDLS) may be used for WFD connection. The WFD devices may determine a connection method based on an associated Basic Service Set Identifier (BSSID) subelement that is transported together with the preferred connectivity information and the WFD information element.

Figure 5:
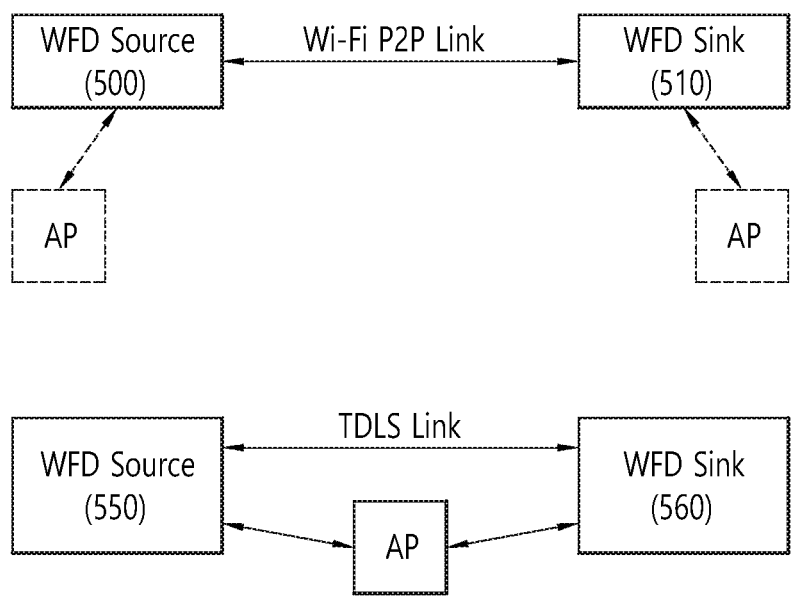
FIG. 5 is a conceptual diagram showing the network between WFD source and WFD sink.

FIG. 5 is a conceptual view illustrating a network between a WFD source and a WFD sink.

In the top of FIG. 5, a connection between a WFD source 500 and a WFD sink 510 based on the Wi-Fi P2P is disclosed, and in the bottom of FIG. 5, a connection between a WFD source 550 and a WFD sink 560 based on the TDLS link is disclosed.

As shown in the top of FIG. 5, the AP may be common or may be different in regard to the WFD source 500 and the WFD sink 510. Alternatively, the AP may not exist. When performing the WFD connection using the TDLS link as shown in the bottom of FIG. 5, the WFD source 550 and the WFD sink 560 need to maintain a connection with the same AP.

The WFD capability exchange and negotiation procedure may be performed after the WFD connection setup procedure between the WFD devices. Through the WFD capability exchange and negotiation, the WFD source and the WFD sink may mutually exchange at least one of codecs supported by each other, profile information of codecs, level information of codecs, and resolution information of codecs. The WFD capability exchange and negotiation may be performed by exchanging messages using Real-time Streaming Protocol (RTSP). Also, a set of parameters defining an audio/video payload during the WFD session may be determined. The WFD capability exchange and negotiation procedure may be performed by exchanges from RTSP M1 to RTSP M4 messages as shown in FIG. 6, which will be described later.

After the WFD exchange and negotiation procedure, the WFD session establishment procedure may be performed.

Figure 6:
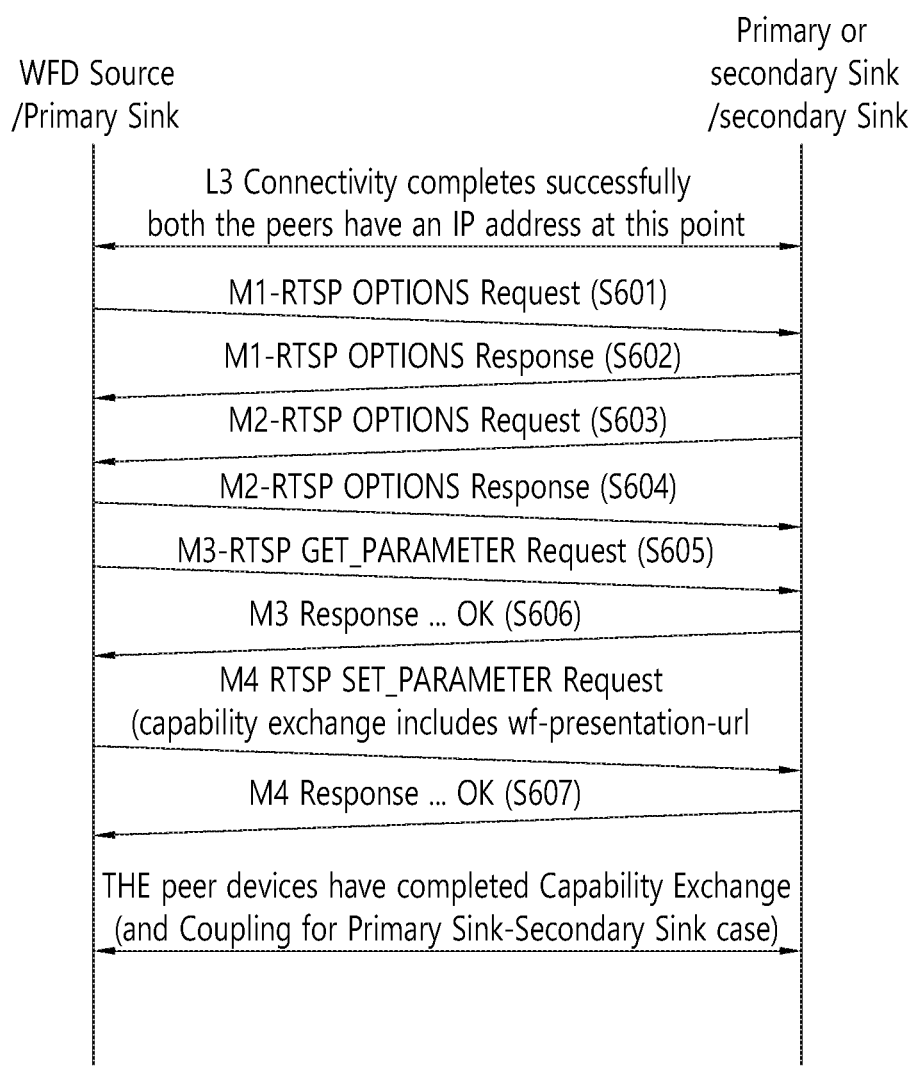
FIG. 6 is a conceptual diagram showing the WFD capability exchange and negotiation procedure.

FIG. 6 is a conceptual view illustrating a WFD capability exchange and negotiation procedure.

Referring to FIG. 6, the WFD source may send an RTSP M1 request message to initiate the RSTP procedure and the WFD capability negotiation (operation S601).

The RTSP M1 request message may include an RTSP options request to determine a set of RTSP methods supported by the WFD sink. The WFD sink receiving the RTSP M1 request message may transmit an RTSP M1 response message in which the RTSP methods that the WFD sink itself supports are enumerated (operation S602).

Thereafter, the WFD sink may send an RTSP M2 request message to determine a set of RTSP methods that the WFD source supports (operation S603).

When the RTSP M2 request message is received, the WFD source may respond with an RTSP M2 response message in which the RTSP methods that the WFD source itself supports are enumerated (operation S604).

The WFD source may send an RTSP M3 request message (RTSP GET PARAMETER request message) specifying a list of WFD capabilities that the WFD source desires to know (operation S605).

When the RTSP M3 request message is received, the WFD sink may respond with an RTSP M3 response message (RTSP GET PARAMETER response message) (operation S606).

Based on the RTSP M3 response message, the WFD source may determine an optimal set of parameters to be used during the WFD session, and may send an RTSP M4 request message (RTSP SET PARAMETER request message) including the determined set of parameters to the WFD sink.

The WFD sink receiving the RTSP M4 request message may send an RTSP M4 response message (RTSP SET PARAMETER response message) (operation S607).

Figure 7:
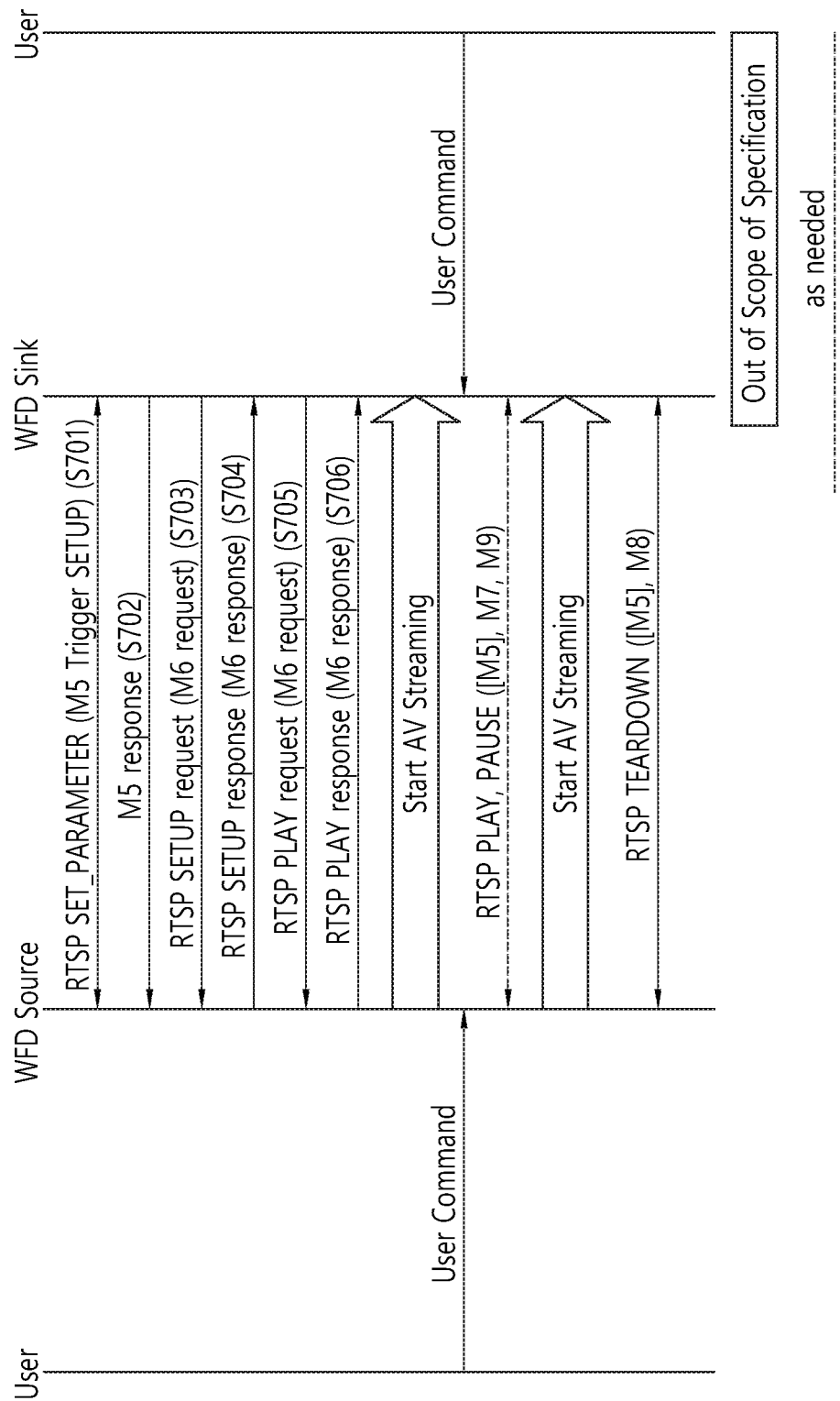
FIG. 7 is a conceptual diagram showing the WFD session establishment procedure.

FIG. 7 is a conceptual view illustrating a WFD session establishment procedure.

In FIG. 7, the WFD source/WFD sinks that have performed WFD capability exchange and negotiation may establish a WFD session. Specifically, the WFD source may transmit an RTSP SET parameter request message (RTSP M5 Trigger SETUP request) to the WFD sink (S701).

The WFD sink may send an RTSP M5 response message in response to the RTSP SET parameter request message (operation S702).

When the RTSP M5 message including a trigger parameter setup is successfully exchanged, the WFD sink may transmit an RTSP SETUP request message (RTSP M6 request) to the WFD source (operation S703).

When the RTSP M6 request message is received, the WFD source may respond with an RTSP SETUP response message (RTSP M6 response) (operation S704).

Successful establishment of the RTSP session may be instructed through the setting of the status code of the RTSP M6 response message.

After a successful exchange of the RTSP M6 message, the WFD sink may send an RTSP M7 request message to the source device to indicate that it is ready to receive the RTP stream (operation S705), and the WFD source may respond with an RTSP PLAY response message (RTSP M7 response message) (operation S706). Successful establishment of the WFD session may be instructed based on the status code of the RTSP PLAY response message.

After the WFD session is established, the WFD source transmits, to the WFD sink, an RTSP M3 request message (RTSP GET PARAMETER request message) for acquiring capability for at least one RTSP parameter supported by the WFD sink, an RTSP M4 request message for setting at least one RTSP parameter value corresponding to the WFD session for capacity renegotiation between the WFD source and the WFD sink for Audio/Video (AV) formal renewal, an RTSP M5 request message for triggering the WFD sink to transmit an RTSP pause request message (RTSP M9 request message), an RTSP M12 request message for indicating that the WFD source enters WFD standby mode, an RTSP M14 request message for selecting input types to be used in a User Input Back Channel (UIBC), input device and other parameters, or an RTSP M15 request message for enabling or disabling the User Input Back Channel (UIBC). The WFD sink receiving the above-described RTSP request messages from the WFD source may respond with RTSP response messages.

Thereafter, the WFD sink may transmit, to WFD source, an RTSP M7 request message (RTSP PLAY request message) for starting (or resuming) audio/video streaming, an RTSP M9 request message (RTSP pause request message) for pausing audio/video streaming transmitted from the WFD source to the WFD sink, an RTSP M10 request message for requesting the WFD source to change an audio rendering device, an RTSP M11 request message indicating a change of the active connector type, an RTSP M12 request message indicating that the WFD sink has entered the WFD standby mode, an RTSP M13 request message for requesting the WFD source to refresh an Instantaneous Decoding Refresh (IDR), an RTSP M14 request message for selecting an input type to be used in the UIBC, input devices and other parameters, RTSP M15 request message for enabling or disabling the UIBC. The WFD source receiving the above-enumerated RTSP request messages from the WFD sink may respond with RTSP response messages.

When the WFD session is established and audio/video streaming begins, the WFD source and the WFD sink may proceed with audio/video streaming using codecs commonly supported by both of the WFD source and the WFD sink. As the codecs commonly supported by the WFD source and the WFD sink are used, the interoperability between the WFD source and the WFD sink may be guaranteed.

The WFD communication is based on the WFD IE, and the format of the WFD IE may be defined as shown in Table 1 below.

TABLE 1

| Field | Size (octets) | Value (Hexadecimal) | Description |
| --- | --- | --- | --- |
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

Table 1 includes element ID field, length field, WFA-specific OUI field, OUI field indicating the type/version of WFD IE, and WFD subelement field. The WFD subelement field has a format as shown in Table 2 below.

TABLE 2

| Field | Size (octets) | Value (Hexadecimal) | Description |
| --- | --- | --- | --- |
| Subelement ID | 1 | | Identifying the type of WFD subelement. The specific value is defined in Table 5-3. |
| Length | 2 | Variable | Length of the following fields in the subelement |
| Subelements body field | Variable | | Subelement specific information fields |

The subelement ID may be defined as Table 3 below.

TABLE 3

| Subelement ID (Decimal) | Notes |
| --- | --- |
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

Referring to Table 3, the subelement ID field of one octet may indicate what information the WFD subelement contains. Specifically, the values of the subelement ID fields 0, 1, . . . , 10 may indicate that the subelements are WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, and Alternative MAC Address subelement, respectively. Here, the WFD Device Information subelement may include information necessary to decide whether to attempt to pair with the WFD device and create a session. The Associated BSSID subelement may be used to indicate the address of the currently associated AP. The WFD Audio Formats subelement, WFD Video Formats subelement, and WFD 3D Video Formats subelement may be used to indicate the capability of the WFD device related to audio, video, and 3D video, respectively. The WFD Content Protection subelement deliver information related to the content protection method, and the Coupled Sink Information subelement may deliver information about the state of the coupled sink, the MAC address, and the like. The WFD Extended Capability subelement is used to deliver various pieces of capability information of other WFD devices, and the Local IP Address subelement may be used to deliver an IP address to a WFD peer in the TDLS setup process. The WFD Session Information subelement may include information such as a list of WFD device information technicians in a WFD group. When the WFD connection method requires an interface (e.g., a MAC address) different from that used in the device discovery, the Alternative MAC Address subelement may deliver relevant information.

In accordance with one embodiment of the present disclosure, a method for controlling a video stream by a WFD sink (or primary sink) in WFDS is disclosed.

Figure 8:
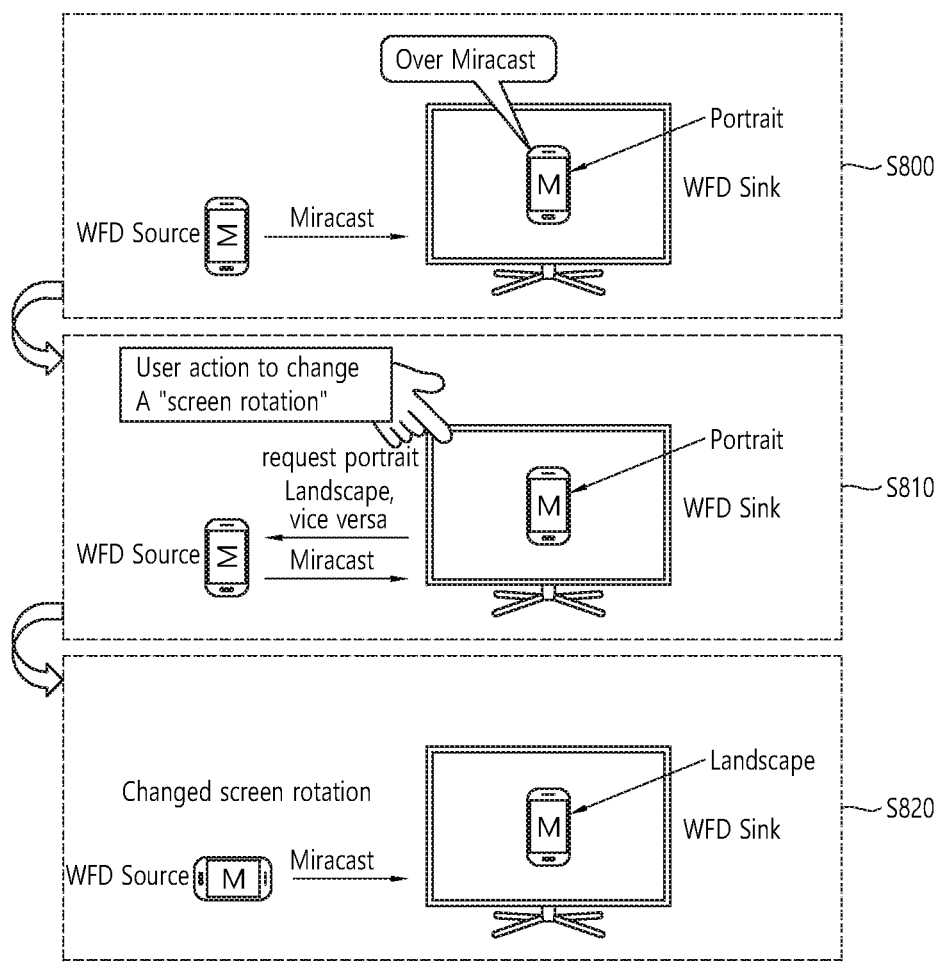
FIG. 8 is a conceptual diagram showing the method for controlling the WFD sink according to an embodiment of the present disclosure.

FIG. 8 is a conceptual diagram showing the method for controlling the WFD sink according to one embodiment of the present disclosure.

Referring to FIG. 8, there is provided a method for transmitting, by the WFD sink, a signal to change the orientation of an image output based on a video stream (or multimedia stream) transmitted to the WFD sink by the WFD source, and transmitting, by the WFD source, a video stream reflecting the changed orientation of the image to the WFD sink.

Referring to FIG. 8, a WFD source may transmit a video stream to a WFD sink based on Miracast (or WFDS) (operation S800).

The WFD sink may output on the screen an image (or an image in portrait mode) having a horizontal orientation based on the received video stream.

The user may rotate the image of the portrait mode output from the WFD sink based on the user input signal to change the orientation of the image from the horizontal direction to the vertical direction (operation S810).

For example, the user may rotate the image by touching the image output from the WFD sink by hand. In this case, the WFD sink may request the WFD source to change the orientation (or rotation direction) of the image output by the video stream transmitted by the WFD source. For example, the WFD sink may request that the orientation of the transmitted video stream be switched from a horizontal direction orientation (or portrait mode) to a vertical direction orientation (landscape mode).

According to an embodiment of the present disclosure, a video stream control RTSP (Real Time Steaming Protocol) parameter for requesting switching of the orientation of the image output by the transmitted video stream may be defined. The specific video stream control RTSP parameters will be described later.

The WFD source receives the video stream control RTSP parameter. The WFD source may transmit to the WFD sink a video stream including an image of the orientation changed based on the value configured by the video stream control RTSP parameter.

As described above, when the WFD sink requests to switch the image orientation from the portrait mode to the landscape mode based on the video stream control RTSP parameter, the WFD source may transmit to the WFD sink a video stream including the corresponding image changed into the landscape mode (operation S820).

In addition, a video stream control RTSP parameter may be defined for video stream control to request the WFD source to transmit a multimedia stream configured with a lower resolution/lower refresh rate. The specific parameters for adjusting the resolution and refresh rate as included in the video stream control RTSP parameter will be described later.

The WFD source receives the video stream control RTSP parameter, and, the WFD source may transmit to the WFD sink a video stream having a resolution/refresh rate as changed based on the value set via the video stream control RTSP parameter. Alternatively, the WFD source may receive the video stream control RTSP parameter, and the WFD source may transmit to the WFD sink a multimedia stream having an optimal resolution and an optimal refresh rate based on the video stream control RTSP parameter.

Table 4 below shows the video stream control RTSP parameters.

TABLE 4

| | |
|---|---|
| wfd2-video-stream-control | ="wfd2_video_stream_control:" SP v-stream-control CRLF |
| v-stream-control | ="none"/(res-bitmap SP fps-bitmap); "none" if not supported |
| res-bitmap | =2*2HEXDIG; see table below, B4:B0 set to 1 in M3 Resp, at most one bit may be set to 1 at M21 Req |
| fps-bitmap | =2*2HEXDIG; see table below, B4:B0 set to 1 in M3 Resp, at most one bit may be set to 1 at M21 Req |
| rotation-bitmap | =2*2HEXDIG; see table below, B2:B0 set to 1 in M3 Resp, at most one bit may be set to 1 at M21 Req |

The video stream control RTSP parameter (wfd2 video stream control) may include a video stream control (v-stream-control) parameter, a resolution bitmap parameter (res-bitmap), a refresh rate bitmap (fps-bitmap) parameter, and a rotation bitmap parameter.

If the video stream control based on the video stream control RTSP parameter is not supported, the video stream control parameter may not be included in the RTSP message.

If the video stream control based on the video stream control RTSP parameters is supported, the video stream control parameter may include a value corresponding to each of a resolution bitmap and a refresh rate bitmap.

The resolution bitmap parameter may include information on the resolution of the video stream based on a hexadecimal number (HEXDIG). The resolution bitmap parameter may be 8 bits.

The RTSP M3 response message may include a resolution bitmap parameter with all of the first bit (B0) to the fifth bit (B4) being set to 1.

The RTSP M21 request message may request a specific resolution configuration based on a resolution bitmap parameter having one bit at most set to 1.

The RTSP M4 request message may include identification information about a specific resolution configured based on the RTSP M21 request message.

The refresh rate bitmap parameter may include information on a refresh rate of a video stream based on a hexadecimal number (HEXDIG). The refresh rate parameter may be 8 bits.

The RTSP M3 response message may include a refresh rate bitmap parameter having all of a first bit (B0) to a fifth bit (B4) set to 1.

The RTSP M21 request message may request a specific resolution configuration based on a refresh rate bitmap parameter with one bit at most set to 1.

The RTSP M4 request message may include identification information about a specific refresh rate based on the RTSP M21 request message.

The rotation bitmap parameter may indicate information on the orientation of the image output based on the hexadecimal number (HEXDIG).

The RTSP M3 response message may include a rotation bitmap parameter having all of a first bit (B0) to a fifth bit (B4) set to 1.

The RTSP M21 request message may request a configuration of the specific orientation of an image based on a rotation bitmap parameter with one bit at most set to 1.

The RTSP M4 request message may include identification information on the specific orientation of the image based on the RTSP M21 request message.

Table 5 below shows the resolution bitmap parameters.

TABLE 5

| Bit location | Name & meaning |
|---|---|
| B7:B4 | Reserved (Set to zeros at Tx, ignore at Rx) |
| B3 | Maximum resolution supported by the WFD Source and the WFD Sink |
| B2 | Higher resolution than currently in use |
| B1 | Lower resolution than currently in use |
| B0 | Minimum resolution supported by the WFD Source and the WFD Sink |

Referring to Table 5, B0 may indicate that the video stream to be transmitted to the WFD sink is configured to have the minimum resolution supported by the WFD source and the WFD sink.

B1 may indicate to configure the video stream to be transmitted to the WFD sink with a resolution lower than the currently used resolution.

B2 may indicate that a video stream to be transmitted to the WFD sink is configured to have a higher resolution than the currently used resolution.

B3 may indicate to configure the video stream to be transmitted to the WFD sink with the maximum resolution supported by the WFD source and the WFD sink.

The bit values corresponding to bits B4 to B7 are reserved values and are set to zero at the time of transmission and may be ignored at the time of reception.

Table 6 below shows refresh rate bitmap parameters.

TABLE 6

| Bit location | Name & meaning |
|---|---|
| B7:B4 | Reserved (Set to zeros at Tx, ignore at Rx) |
| B3 | Maximum fps at the resolution |
| B2 | Higher fps than currently in use |
| B1 | Lower fps than currently in use |
| B0 | Minimum fps at the resolution (*) |

Referring to Table 6, B0 may indicate that a video stream to be transmitted to the WFD sink should be configured to have a minimum fps (frame per second) applicable at a configured resolution.

B1 may indicate to configure the video stream to be transmitted to the WFD sink to have a lower fps than the currently used fps.

B2 may indicate to configure the video stream to be transmitted to the WFD sink to have a higher fps than the currently used fps.

B3 may instruct to configure the video stream to be transmitted to the WFD sink to have a maximum fps applicable at the configured resolution.

The bit values corresponding to bits B4 to B7 are reserved values and are set to zero at the time of transmission and may be ignored at the time of reception.

If the WFD source supports frame skipping and the value of B1 is 1, this may mean specific fps (for example, 3.5 frames/second). If the WFD source does not support frame skipping and the value of B1 is 1, the minimum fps may be determined based on the selected resolution.

Table 7 below shows the rotation bitmap parameter table.

TABLE 7

| Bit location | Name & meaning |
| --- | --- |
| B7:B2 | Reserved (Set to zeros at Tx, ignore at Rx) |
| B1 | Rotate Landscape to Portrait |
| B0 | Rotate Portrait to Landscape |

Referring to Table 7, B0 may indicate that an image to be output by the video stream is rotated to the landscape mode from the portrait mode.

B1 may indicate that the image to be output by the video stream is rotated to the portrait mode from the landscape mode.

The WFD source may switch the orientation of the image output based on the video stream based on the rotation bitmap parameter included in the video stream control RTSP parameter transmitted from the WFD sink to the WFD source.

Moreover, according to the embodiment of the present disclosure, a separate RTSP parameter may be defined to indicate the change in orientation of the image.

Table 8 below describes the separately defined rotation control RTSP parameters.

TABLE 8

| wfd2-rotation-control | ="wfd2_rotation_control:" SP rotation-type CRLF rotation-type = "Protrait_to_Landscape" / "Landscape_to_Portrait" |
| --- | --- |

Referring to Table 8, the wfd2-rotation-control parameter may be used to indicate a change in the orientation of the video being reproduced.

The wfd2-rotation-control parameter is included and transmitted in the RTSP M4 request message and the RTSP M4 response message. The wfd2-rotation-control parameters may indicate a change in orientation of an image reproduced based on the video stream.

Figure 9:
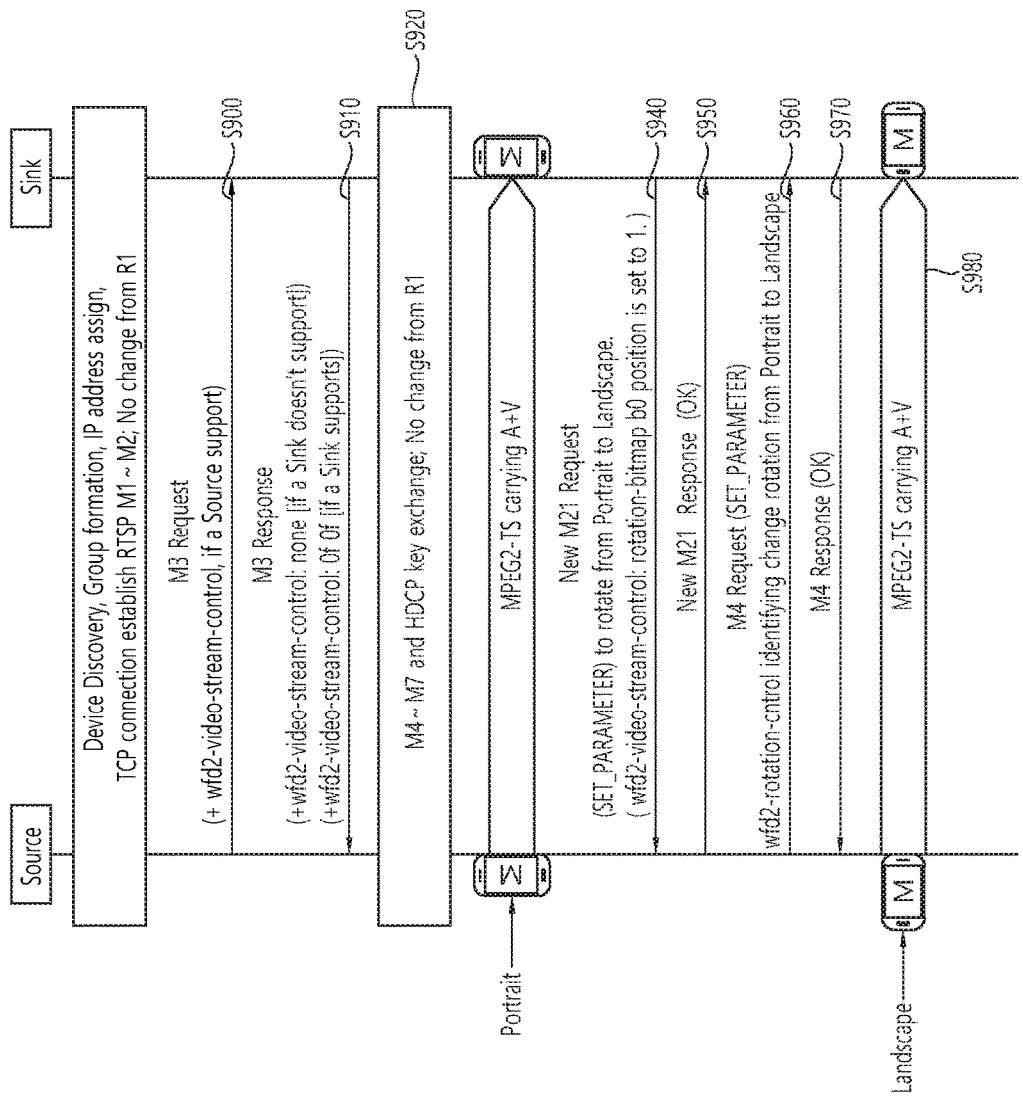
FIG. 9 is a conceptual diagram showing the method of changing the orientation of the image according to an embodiment of the present disclosure.

FIG. 9 is a conceptual diagram showing the method of changing the orientation of the image according to an embodiment of the present disclosure.

Referring to FIG. 9, the WFD source and the WFD sink may perform device search, group formation, IP (Internet Protocol) address allocation, and TCP (Transmission Control Protocol) connection configuration based on the RTSP M1/M2 messages.

The WFD source may transmit the RTSP M3 request message to the WFD sink (operation S900).

If the WFD source supports control of a video stream based on the video stream control RTSP parameter, the RTSP M3 request message may include the video stream control RTSP parameter (or wfd2-video stream-control).

As described above, the video stream control RTSP parameter may include the resolution bitmap parameter, the refresh rate bitmap parameter, and the rotation bitmap parameter.

The WFD sink may transmit the RTSP M3 response message to the WFD source (operation S910).

If the WFD sink supports control of a video stream based on the video stream control RTSP parameter, the video stream control RTSP parameter in the RTSP M3 response message to be transmitted by the WFD sink is set to '0f0f'. This may instruct control of the video stream based on the video stream control RTSP parameter.

If the WFD sink does not support video stream control based on video stream control RTSP parameters, the video stream control RTSP parameter may not be included in the RTSP M3 response message to be transmitted by the WFD sink.

The WFD source and WFD sink exchange RTSP M4 message to RTSP M7 message, and the WFD source and the WFD sink may perform high-bandwidth digital content protection (HDCP) key exchange (operation S920).

The WFD source may transmit a video stream having a portrait mode to the WFD sink (operation S930).

For example, video content/audio content based on MPEG2-TS may be transmitted from the WFD source to the WFD sink. Then, the video content may be output in a portrait mode on the WFD sink.

The WFD sink may transmit the RTSP M21 request message to the WFD source (operation S940).

The RTSP M21 request message may be sent from the WFD sink to the WFD source to change the orientation of the image (or to change the screen rotation type).

The WFD sink may include a rotation bitmap parameter into the RTSP M21 request message to indicate rotation of the image to be output from the WFD sink from the portrait mode to the landscape mode For example, if 'b0' of the rotation bitmap is set to 1, it may indicate that the output mode of the image is to be converted from the portrait mode to the landscape mode.

In another expression, if 'b0' of the rotation bitmap is set to 1, it may indicate that the orientation of the image is to be transformed from the horizontal direction to the vertical direction.

The WFD source may transmit an RTSP M21 response message to the WFD sink in a response to reception of the RTSP M21 request message (operation S950).

The RTSP M21 response message may include information about acceptance of a change in orientation of the image as indicated based on the RTSP M21 request message.

The WFD source may send an RTSP M4 request message to the WFD sink (operation S960).

The RTSP M4 request message may include a rotation control RTSP parameter (or wfd2-rotation-control). The rotation control RTSP parameter may indicate a rotation change from the portrait mode to the landscape or a rotation change from the landscape mode to the portrait mode.

The WFD sink may send an RTSP M4 response message to the WFD source (operation S970).

The RTSP M4 response message may include information on acceptance of a change in the orientation of the image as indicated based on the RTSP M4 request message.

The WFD source may transmit a video stream having the landscape mode to the WFD sink (operation S980).

For example, video content audio content based on MPEG2-TS may be transmitted from the WFD source to the WFD sink. Then, the video content may be output in the landscape mode on the WFD sink.

Figure 10:
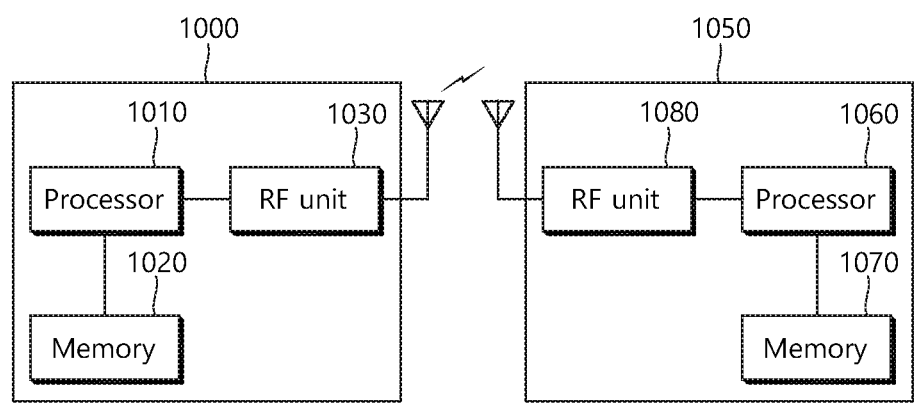
FIG. 10 is a block diagram of a wireless device to which an embodiment of the present disclosure may be applied.

FIG. 10 is a block diagram of a wireless device to which an embodiment of the present disclosure may be applied.

Referring to FIG. 10, the wireless device may be embodied as a WFD source 1000 (or a first WFD device) and a WFD sink 1050 (or a second WFD device) as configured to implement the above-described embodiments.

The WFD source 1000 includes a processor 1010, a memory 1020, and a RF communication unit 1030.

The RF unit 1030 may communicate with the processor 1010 to transmit/receive a radio signal.

The processor 1010 may implement the functions, procedures and/or methods proposed in the present disclosure. For example, the processor 1010 may be implemented to perform the operation of the WFD source 1000 according to the embodiment of the present disclosure described above. The processor may perform the operations of the WFD source 1000 as disclosed in the embodiments of FIGS. 1 to 9.

For example, the processor 1010 may be configured to transmit to the second WFD device a real time streaming protocol (RTSP) M message 3 request message for requesting information on a video stream control RTSP parameter of the second WFD device. The processor 1010 may be configured to receive an RTSP M3 response message in a response to the RTSP M3 request message from the second WFD device. The RTSP M3 response message may include a video stream control RTSP parameter about the video stream control capability of the second WFD device.

The video stream control RTSP parameter includes a rotation bitmap parameter. The rotation bitmap parameter may indicate whether the first change of the orientation or the second change thereof is supported. The first change may be the change from the first orientation to the second orientation, while the second change may be a change from the second orientation to the first orientation.

In addition, the processor 1010 may be configured to transmit to the second WFD device a first video stream to be displayed in the first orientation on the second WFD device. The processor may be configured to receive an RTSP M21 request message from the second WFD device. The RTSP M21 request message requests that the first video stream be changed to a second video stream, wherein the second video stream will be displayed in the second orientation on the second WFD device. The processor may be configured to transmit an RTSP M21 response message to the second WFD device, wherein the RTSP M21 response message may indicate acceptance of the change.

The transmission of the RTSP M21 request message may be triggered by an orientation change input signal by the user, wherein the input signal indicates that the orientation of the image on the second WFD device is changed from the first orientation to the second orientation.

The second WFD device may be embodied as a device configured to receive and render the first video stream and the second video stream from the first WFD device via a peer-to-peer link with the first WFD device.

Further, the processor 1010 may be configured to send an RTSP M4 request message to the second WFD device. The RTSP M4 request message includes a rotation control RTSP parameter indicating the second orientation of the second video stream to be transmitted after the first video stream. The processor may be configured to receive, from the second WFD device, an RTSP M4 response message in a response to the RTSP M4 request message. The RTSP M4 response message indicates acceptance of the second orientation of the second video stream. The processor may be configured to transmit the second video stream to the second WFD device.

The WFD sink 1050 includes a processor 1060, a memory 1070, and an RF communication unit 1080.

The RF unit 1080 can communicate with the processor 1060 to transmit/receive radio signals.

The processor 1060 may implement the functions, procedures and/or methods proposed in the present disclosure. For example, the processor 1060 may be implemented to perform the operation of the WFD sink 1050 according to the embodiment of the present disclosure described above. The processor may perform the operation of the WFD sink 1050 (or the second WFD device) in the embodiments of FIGS. 1 to 9.

For example, the processor 1060 may be configured to send an RTSP M3 response message in response to an RTSP M3 request message. The RTSP M3 response message may include a video stream control RTSP parameter about the video stream control capability of the second WFD device.

In addition, the processor 1060 may be configured to transmit the RTSP M21 request message to the first WFD device to request a change in the orientation of the first video stream while receiving the first video stream to be displayed in the first orientation from the first WFD device. The RTSP M21 request message may request that the first video stream be changed to the second video stream. The second video stream will be displayed in the second orientation on the second WFD device.

Each of the processors 1010 and 1060 may include application-specific integrated circuits (ASICs), other chipsets, logic circuits, data processing units, and/or a converter for converting the baseband signal and the radio signal to each other. Each of memory 1020 and 1070 may include read-only memory (ROM), random access memory (RAM), flash memory, memory cards, storage media, and/or other storage devices. RF units 1030 and 1080 each may include one or more antennas for transmitting and/or receiving radio signals.

When the above-described embodiment is implemented in software, the above-described techniques may be implemented with modules (processes, functions, and so on) that perform the functions described above. The module may be stored in the memory 1020 or 1070. The module may be executed by the processors 1010 or 1060. The memories 1020 and 1070 may be internal or external to the processors 1010 and 1060 respectively. Each of the memories may be coupled to each of the processors 1010, 1060 via various well known means.

What is claimed is:

1. A method for changing an orientation of an image, the method comprising:
    transmitting, by a first Wi-Fi Display (WFD) device, a first request message to a second WFD device;
    receiving, by the first WFD device, a first response message including a video stream control parameter, a resolution bitmap parameter, a refresh rate bitmap parameter, and a first rotation bitmap parameter of the second WFD device from the second WFD device in response to the first request message,
    wherein the video stream control parameter includes a first field for video stream control capability of the second WFD device,
    wherein the resolution bitmap parameter includes a second field for minimum resolution supported by the second WFD, a third field for maximum resolution supported by the second WFD device, a fourth field related to whether a resolution of a first video stream to be transmitted has a higher resolution than a currently used resolution, and a fifth field related to whether the resolution of the first video stream has a lower resolution than the currently used resolution,
    wherein the refresh rate bitmap parameter includes a sixth field for minimum frame per second (FPS) supported by the second WFD device, a seventh field for maximum FPS supported by the second WFD device, an eighth field related to whether FPS of the first video stream has a lower FPS than a currently used FPS, and a ninth field related to whether FPS of the first video stream has a higher FPS than the currently used FPS, wherein the first rotation bitmap parameter includes a tenth field related to whether a first orientation is converted from a horizontal direction to a vertical direction, and an eleventh field related to whether the first orientation is converted from the vertical direction to the horizontal direction;

transmitting, by the first WFD device, the first video stream to the second WFD device based on the video stream control parameter, the resolution bitmap parameter, the refresh rate bitmap parameter, and the first rotation bitmap parameter, wherein the first video stream is related to the first orientation; and receiving, by the first WFD device, a second request message including a second rotation bitmap parameter from the second WFD device, wherein the second rotation bitmap parameter includes first information on a second orientation related to a second video stream.

2. The method of claim 1, wherein the transmission of the second request message is triggered by an orientation change input signal by a user on the second WFD device, wherein the orientation change input signal includes second information that an orientation of the second video stream on the second WFD device is changed from the first orientation to the second orientation.

3. The method of claim 2, wherein the method further comprising:

transmitting, by the first WFD device, a second response message to the second WFD device, wherein the second response message is related to acceptance of the first information;

transmitting, by the first WFD device, a third request message including a rotation control parameter related to the second orientation of the second video stream to the second WFD device, wherein the second video stream is to be displayed in the second orientation on the second WFD device;

receiving, by the first WFD device, a third response message from the second WFD device in a response to the third request message, wherein the third response message is related to acceptance of the second orientation of the second video stream; and transmitting, by the first WFD device, the second video stream to the second WFD device.

4. A first WiFi display (WFD) device configured for changing an orientation of an image, wherein the first WFD device comprising:

a transceiver configured for transmitting and receiving signals; and a processor operatively coupled to the transceiver, wherein the processor is configured for:

transmitting a first request message to the second WFD device;

receiving a first response message including a video stream control parameter, a resolution bitmap parameter, a refresh rate bitmap parameter, and a first rotation bitmap parameter of the second WFD device from the second WFD device in response to the first request message, wherein the video stream control parameter includes a first field for video stream control capability of the second WFD device, wherein the resolution bitmap parameter includes a second field for minimum resolution supported by the second WFD, a third field for maximum resolution supported by the second WFD device, a fourth field related to whether a resolution of a first video stream to be transmitted has a higher resolution than a currently used resolution, and a fifth field related to whether the resolution of the first video stream has a lower resolution than the currently used resolution, wherein the refresh rate bitmap parameter includes a sixth field for minimum frame per second (FPS) supported by the second WFD device, a seventh field for maximum FPS supported by the second WFD device, an eighth field related to whether FPS of the first video stream has a lower FPS than a currently used FPS, and a ninth field related to whether FPS of the first video stream has a higher FPS than the currently used FPS, wherein the first rotation bitmap parameter includes a tenth field related to whether a first orientation is converted from a horizontal direction to a vertical direction, and an eleventh field related to whether the first orientation is converted from the vertical direction to the horizontal direction;

transmitting the first video stream to the second WFD device based on the video stream control parameter, the resolution bitmap parameter, the refresh rate bitmap parameter, and the first rotation bitmap parameter, wherein the first video stream is related to the first orientation; and receiving a second request message including a second rotation bitmap parameter from the second WFD device, wherein the second rotation bitmap parameter includes first information on a second orientation related to a second video stream.

5. The first WFD device of claim 4, wherein the transmission of the second request message is triggered by an orientation change input signal by a user on the second WFD device, wherein the orientation change input signal includes second information that an orientation of the second video stream on the second WFD device is changed from the first orientation to a second orientation.

6. The first WFD device of claim 5, wherein the processor is further configured for:

transmitting a second response message to the second WFD device, wherein the second response message is related to acceptance of the first information;

transmitting a third request message including a rotation control parameter related to the second orientation of the second video stream to the second WFD device, wherein the second video stream is to be displayed in the second orientation on the second WFD device;

receiving a third response message from the second WFD device in a response to the third request message, wherein the third response message is related to acceptance of the second orientation of the second video stream; and transmitting the second video stream to the second WFD device.

* * * * *